Figure 1:
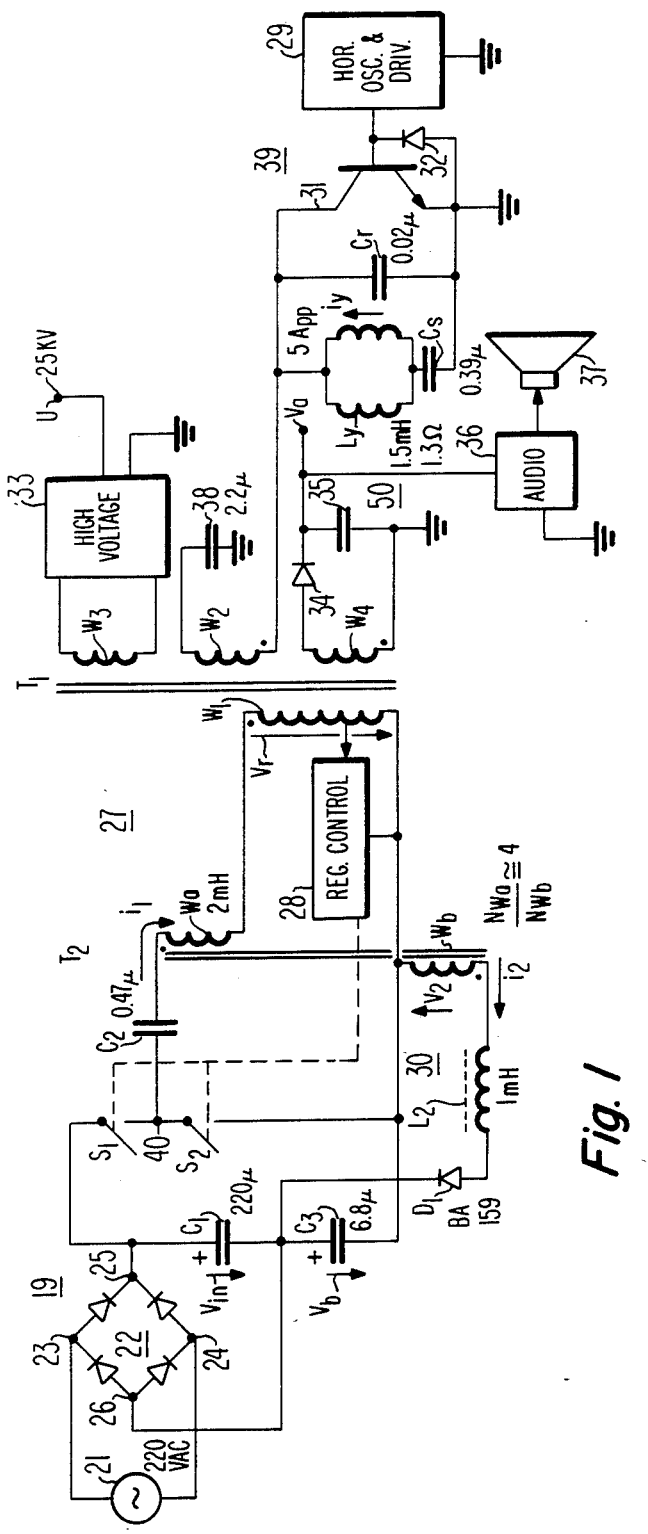

United States Patent [19]

Haferl

[11] Patent Number: 4,604,556
[45] Date of Patent: Aug. 5, 1986

[54] TELEVISION RECEIVER LOAD COMPENSATION CIRCUIT

[75] Inventor: Peter E. Haferl, Adliswil, Switzerland

[73] Assignee: RCA Corporation, Princeton, N.J.

[21] Appl. No.: 564,912

[22] Filed: Dec. 23, 1983

[30] Foreign Application Priority Data

Jul. 1, 1983 [GB] United Kingdom ............... 8317970

[51] Int. Cl.$^4$ .................... H01J 29/70; H04N 5/63
[52] U.S. Cl. .................... 315/411; 315/408; 315/371; 358/190; 363/75
[58] Field of Search ............ 315/411, 408, 371; 358/190; 363/21, 75

[56] References Cited

U.S. PATENT DOCUMENTS 4,298,829 11/1981 Luz ........................ 315/408

*Primary Examiner*—Theodore M. Blum
*Assistant Examiner*—Gregory C. Issing
*Attorney, Agent, or Firm*—Eugene M. Whitacre; Paul J. Rasmussen; Joseph J. Laks

[57] ABSTRACT

A deflection circuit is coupled to a horizontal deflection winding for generating scanning current in the winding. A retrace pulse voltage is developed across the deflection winding during the retrace interval. A flyback transformer is coupled to the deflection circuit and has retraced pulse voltages developed across windings thereof. A source of supply energy is coupled to a first winding of the flyback transformer and a load circuit, such as a high power audio circuit, is coupled to a second winding of the transformer and draws load current therefrom. A switched mode power supply is coupled to the source of supply energy and to the flyback transformer for controlling the transfer of energy between the source and the load circuit. A compensation circuit responsive to the operation of the switched mode power supply produces variations in current in an inductance coupled to the flyback transformer. These variations are indicative of variations in load current drawn by the load circuit. The flyback transformer couples the inductance to the retrace resonant circuit for a variable amount of time during retrace to control the transformer trace-retrace duty cycle in a manner that compensates for retrace time modulation due to loading variations.

11 Claims, 2 Drawing Figures

TELEVISION RECEIVER LOAD COMPENSATION CIRCUIT

This invention relates to line-synchronous power supplies in which the flyback transformer distributes power for the television receiver. In particular, a passive load compensation circuit controls the line or horizontal retrace time when the flyback transformer is heavily loaded during the horizontal trace interval due to such load circuits as the high power audio output amplifiers.

In power supply systems like "SICOS" described in U.S. patent application Ser. No. 333,610, filed Dec. 22, 1981, by P. E. Haferl entitled REGULATED DEFLECTION CIRCUIT, now U.S. Pat. No. 4,484,113 herein incorporated by reference, the regulator control circuit may be responsive to the peak voltage of the horizontal retrace pulse in order to obtain good regulation of horizontal scan amplitude and high voltage. Heavy load variations of the flyback transformer during the horizontal trace interval may cause retrace time modulation, resulting in a disturbing picture width modulation. Generally, the horizontal retrace time tends to increase with increased trace loading. When the loading is due to power being consumed by high power audio output amplifiers, disturbing picture width modulation becomes noticeable at power levels that vary around an average of 10 watts DC when an east-west correction circuit is used such as described in U.S. patent application Ser. No. 428,238, filed Sept. 29, 1982, by P. E. Haferl, entitled VARIABLE HORIZONTAL DEFLECTION CIRCUIT CAPABLE OF PROVIDING EAST-WEST PINCUSHION CORRECTION, now U.S. Pat. No. 4,429,257. When such an east-west correction circuit is not used, disturbing picture width becomes noticeable even at lower power levels.

A feature of the invention is a regulated power supply and deflection circuit that is compensated for audio loading of the flyback transformer to maintain relatively stable raster width. A deflection circuit is coupled to a deflection winding for generating scanning current therein. A deflection retrace pulse voltage is developed across a deflection winding during a retrace interval. A flyback transformer is coupled to the deflection circuit and a resonant retrace circuit produces transformer retrace pulse voltage across windings thereof during the retrace interval. A source of supply energy is coupled to a first winding of the flyback transformer and a load circuit is coupled to a second winding of the transformer to draw load current therefrom. Switching means is coupled to the source of supply energy for controlling the transfer of energy between the source and the load circuit. An inductance is coupled to the flyback transformer. A load compensation circuit responsive to the switching means produces variations of current in the inductance that are indicative of variations in current drawn by the load circuit. The flyback transformer couples the inductance to the retrace resonant circuit for controlling the transformer retrace pulse voltages in accordance with current variations drawn by the load circuit.

Figure 2:
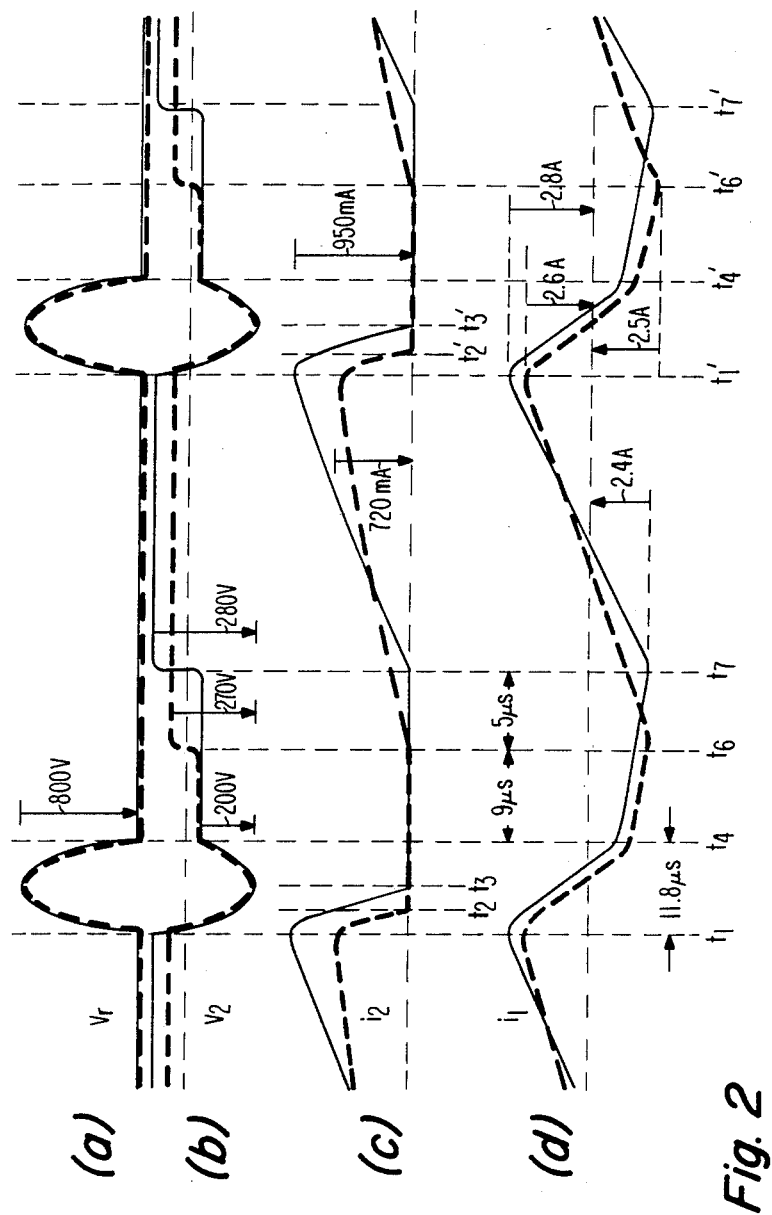

FIG. 1 illustrates a switch mode power supply and deflection circuit including a load compensation network embodying the invention; and FIG. 2 illustrates waveforms useful in explaining the operation of the circuit of FIG. 1.

In the regulated power supply and deflection circuit, illustrated in FIG. 1, a source of supply energy 19 comprises an unregulated alternating input voltage 21 coupled between input terminals 23 and 24 of a full-wave bridge rectifier 22 and a mains filter capacitor $C_1$ coupled between an output terminal 25 and a current return terminal 26 of rectifier 22. An unregulated direct voltage $V_{in}$ is developed across capacitor $C_1$.

A switched mode power supply 27 is interposed between the source of supply energy 19 and a horizontal flyback transformer $T_1$ for regulating the transfer of energy between the source and the various load circuits coupled to windings $w_2$–$w_4$ of the flyback transformer. One of the load circuits coupled to flyback transformer $T_1$ is a horizontal deflection circuit 39 coupled to winding $w_2$. A DC blocking capacitor 38 is coupled between the undotted terminal of winding $W_2$ and a chassis ground that is conductively isolated from mains supply 21.

Horizontal deflection circuit 39 comprises a horizontal oscillator and driver circuit 29 coupled to the base of a horizontal output transistor 31 to produce switching of the transistor at the horizontal rate. Horizontal output transistor 31 in conjunction with a damper diode 32 operates to generate a horizontal scanning current $i_y$ in horizontal deflection winding $L_y$ that is in series with an S-shaping capacitor $C_s$. When horizontal output transistor 31 becomes cut off at the end of the horizontal trace interval, horizontal deflection winding $L_y$ forms a deflection retrace resonant circuit with a deflection retrace capacitor $C_r$ for developing a deflection retrace pulse voltage across the deflection winding.

The deflection retrace resonant circuit applies the deflection retrace pulse voltage to winding $W_2$ of flyback transformer $T_1$ to produce retrace pulse voltages across the other windings of the flyback transformer. The retrace pulse voltage developed across winding $W_2$ is stepped up by high voltage winding $w_3$ for energizing a high voltage circuit 33 to develop an ultor voltage at a terminal U for the picture tube, not illustrated in FIG. 1, of the television receiver.

In a voltage supply 50, the voltage developed across winding $w_4$ is trace rectified, or rectified during the horizontal trace interval, by a diode 34 and filtered by a capacitor 35 to develop a low DC voltage $V_a$. The voltage $V_a$ acts as a supply voltage for such load circuits as the vertical deflection circuit, also not illustrated in FIG. 1, and a high power sound circuit comprising a high power audio stage 36 that drives a speaker system 37.

The retrace pulse voltage developed across winding $w_2$ is transformer coupled to winding $w_1$ of flyback transformer $T_1$ to interact with switched mode power supply 27 in the direct and regulated transfer of energy from source 19 without intermediate DC conversion. Switched mode power supply 27 may be similar to that described in the aforementioned Haferl patent application Ser. No. 333,610. Power supply 27 includes controllable, bidirectionally conductive switches $S_1$ and $S_2$ coupled together at an output terminal 40. Coupled across switch $S_2$ is the series arrangement of a capacitor $C_2$, an inductance $w_a$ of a transformer $T_2$ and the winding $w_1$ of transformer $T_1$. Switches $S_1$ and $S_2$ therefore form a push-pull configuration with the aforementioned series arrangement.

During normal running operation, horizontal deflection circuit 39 produces, during the horizontal retrace interval, a pulse voltage across secondary winding $w_4$ of flyback transformer $T_1$ that is then transformer coupled to the magnetically tightly coupled winding $w_1$. The voltage across winding $w_1$ is illustrated in FIG. 2a as the solid-line voltage waveform $V_r$. The pulse voltage appearing at a tap terminal of winding $w_1$ is applied to a pulse width modulator regulator control circuit 28 of switching power supply 27. Regulator control circuit 28 pulse width modulates the operation of push-pull switches $S_1$ and $S_2$ to regulate the amplitude of the retrace pulse voltages developed across the windings of horizontal output transformer $T_1$ against variations in the unregulated input voltage $V_{in}$ and against loading variations produced by the load circuits coupled to the transformer.

At a controllable instant within each horizontal trace interval, at the instant $t_7$ of FIG. 2. for example, switch $S_2$ is made nonconductive, and switch $S_1$ becomes conductive. As illustrated in FIG. 2d, the current $i_1$ in windings $w_a$ of transformer $T_2$ and $w_1$ of transformer $T_1$ is an upwardly going ramp waveform between times $t_7$ and $t'_1$. At the end of the horizontal trace interval, near time $t'_1$, the current $i_1$ has reached a peak positive magnitude storing a given amount of energy in the inductance of winding $w_a$.

At the beginning of the horizontal retrace interval, near time $t'_1$, when horizontal output transistor 31 becomes cut off, and when the deflection retrace resonant circuit is formed, regulator switch $S_1$ is made nonconductive by regulator control circuit 28 and switch $S_2$ becomes conductive. A transfer of energy is initiated from inductor $w_a$ by way of flyback transformer $T_1$ to the deflection retrace resonant circuit and to the retrace driven load circuits coupled to the flyback transformer, such as the ultor high voltage circuit 33 coupled to high voltage winding $w_3$. During the horizontal retrace interval between times $t'_1$ and $t'_4$ the current $i_1$ ramps downwardly under the impetus of the retrace pulse voltage $V_r$ to reach a negative magnitude, near time $t'_4$, that is smaller than the positive peak magnitude of the current near time $t'_1$. This result is indicative of the transfer of energy from the inductance of winding $w_a$ to the load circuits of flyback transformer $T_1$.

At the beginning of the horizontal trace interval, near time $t'_4$ or the corresponding time $t_4$, the current $i_1$ continues to ramp downwardly, albeit at a shallower slope than during the horizontal retrace interval, due to the application to the winding $w_a$ of a voltage comprising the algebraic sum of the voltages developed across capacitor $C_2$ and winding $w_1$ of flyback transformer $T_1$. Beginning at time $t_4$, energy is transferred to the trace rectified voltage supply, 50 by way of flyback transformer windings $w_1$ and $w_2$. This transferred energy is obtained from the energy previously stored in capacitor $C_2$ during the conduction of regulator switch $S_1$. Near time $t_7$, switch $S_2$ is made non-conductive and switch $S_1$ becomes conductive to repeat the energy transfer cycle that occurs during each horizontal deflection interval.

Any load or mains voltage variation that tends to produce a change in the amplitude of retrace pulse voltage $V_r$ causes regulator control circuit 28 to vary the turnoff time of switch $S_2$ in such a manner as to maintain the retrace pulse amplitude relatively unchanged. The dashed-line waveforms of FIG. 2 illustrate a situation of average loading of flyback transformer $T_1$. The turnoff of switch $S_2$ is initiated earlier within the horizontal trace interval, at a time $t_6$. The earlier turnoff of switch $S_2$ is needed to permit the peak magnitude of the current $i_1$ in the inductance of winding $w_a$ to be decreased at the beginning of the horizontal retrace interval, near time $t'_1$, so as to accommodate the decreased need for transfer of energy to the load circuit. A similar situation holds true for changes in mains supply voltage wherein switch $S_2$ is turned off earlier within the horizontal trace interval under high-line mains voltage conditions.

The circuitry as described until now may tend to undesirably change the retrace time of the retrace pulse voltages with changes in loading of trace rectified voltage supply 50 such that with increased loading by high power audio stage 36, for example, the retrace time tends to increase significantly. The retrace time increases with increased trace loading because of the effect of the energy flywheel action produced by deflection circuit 39, winding $w_2$ of transformer $T_1$ and capacitor 38. The trace voltages across the windings of transformer $T_1$ are determined by the voltage across capacitor 38. A high trace load at any winding lowers the voltage across capacitor 38. Consequently, the retrace voltage $V_r$ and in particular the $dV_r/dt$ during the first half of retrace is also decreased. This lowers the $di/dt$ of the current $i_1$ between $t'_1$ and $t'_4$ and delays the zero crossing of the current through winding $w_2$ and delays also, but by a smaller amount, the center of the retrace time. The net result is an increased retrace time. The net effect is for the picture size to tend to increase with increased loading.

Switched mode power supply 27 of FIG. 1 incorporates a load compensation circuit 30, embodying the invention, that maintains a constant retrace pulse duration under varying loading conditions. Load compensation circuit 30 comprises a second winding $w_b$ of transformer $T_2$, an additional compensating inductor $L_2$, a diode $D_1$ and a capacitor $C_3$. Capacitor $C_3$ is coupled between current return terminal 26 of full wave bridge rectifier 22 and the undotted terminal of flyback transformer winding $W_1$. Similarly coupled is the series arrangement of winding $w_b$, inductor $L_2$ and diode $D_1$.

FIG. 2b illustrates the voltage $V_2$ developed across winding $w_b$ of load compensation circuit 30. This voltage is the superposition of the DC voltage chopped by switches $S_1$ and $S_2$ and the retrace pulse voltage $V_r$. The current $i_2$ flowing in the series arrangement of winding $w_b$, inductor $L_2$ and diode $D_1$ is illustrated in FIG. 2c. The current $i_2$ charges capacitor $C_3$ to a positive voltage $V_b$ relative to the bottom plate of the capacitor. The voltage $V_b$ is a boost voltage which adds to the rectified mains voltage $V_{in}$ developed across capacitor $C_1$. Switched mode power supply 27 therefore operates from a higher DC voltage, approximately 10% higher, and is therefore capable of transferring approximately 20% more power to the television receiver load circuits coupled to flyback transformer $T_1$.

Under average loading conditions, illustrated by the dashed-line waveforms of FIG. 2, the voltage $V_2$ increases to a positive voltage level at time $t_6$, and the current $i_2$ begins its upwardly sloping ramp portion at that time. Near time $t'_1$ when switch $S_1$ is turned off by regulator control circuit 28, the voltage $V_2$ reverses polarity when the retrace pulse voltage $V_r$ is applied to the undotted terminal of winding $w_a$. The current $i_2$, after having reached a peak value near time $t'_1$, decreases in magnitude under the influence of the retrace pulse voltage portion of the voltage $V_2$ and reaches zero near time $t'_2$.

During the beginning portion of retrace, during the interval $t'_1$–$t'_2$, inductor $L_2$, by transformer action, is parallel connected to winding $w_a$. The resulting inductivity of winding $w_a$ is therefore lower during the interval $t'_1$–$t'_2$ than it is during the remaining portion of the retrace interval, $t'_2$–$t'_4$.

Because winding $w_a$ is connected to winding $W_1$ of flyback transformer $T_1$ it is in-circuit with the resonant retrace circuit of horizontal deflection circuit 39. The lower inductivity of winding $w_a$ during the interval $t'_1$–$t'_2$ results in a shortened retrace time compared to the retrace time that would exist if switched mode power supply 27 were without load compensation circuit 30. This shortened retrace time varies with load variations on the flyback transformer in such a manner as to compensate for the tendency of the retrace time to change with these variations.

For example, when the load is substantially increased by, for example, an additional trace loading by audio stage 36, the solid-line waveforms of FIG. 2 apply. The tendency of the retrace pulse amplitude $V_r$ to decrease with increased loading is compensated by regulator control circuit 28 by changing the turnoff time of switch $S_2$ to time $t_7$ of FIG. 2. The positive level of the voltage $V_2$ assumed between times $t_7$ and $t'_1$ under increased loading conditions is greater than under the previously described average loading conditions, as illustrated in FIG. 2b. The current $i_2$ in compensating inductor $L_2$ therefore has a steeper slope as illustrated in FIG. 2c and reaches a greater peak magnitude near the beginning of retrace, near time $t'_1$. During retrace, the current $i_2$ takes a longer time to ramp down to zero, reaching zero at a later time $t'_3$.

Inductor $L_2$ is parallel connected to the effective inductance of winding $w_a$ for a longer period of time within the retrace interval than under average loading conditions. Consequently, the retrace time will tend to be shortened under increased loading conditions, compensating for the tendency of the retrace time to increase with load. Thus, different inductivities are coupled in parallel with the deflection retrace resonant circuit for different portions within the retrace interval in accordance with variations in loading of flyback transformer $T_1$. Comparing the solid-line waveform of FIG. 2c with the dashed-line waveform of FIG. 2c, one notes that the coupling of different inductivities during retrace for different durations is accomplished automatically in response to regulator control circuit 28 varying the turnoff time of switch $S_2$ between times $t_6$ and $t_7$.

Any load or mains voltage variation will change via regulator control circuit 28, the turnoff time of switch $S_2$ and the start of the current $i_2$. At high load, current $i_2$ starts at the later time, namely, $t_7$. Consequently, the amplitude at the end of trace near time $t'_1$ is higher and the current returns to zero later during the retrace interval, returning to zero at time $t'_3$. Thus, the current variations in compensating inductor $L_2$ are indicative of current variations in the loading of flyback transformer $T_1$. The result of the operation of load compensation circuit 30 is a retrace time which does not vary with differing loading conditions. In other words, the tendency of the duration of the retrace time to change with variation of load current is eliminated.

As general observations, one notes that the current $i_2$ is the DC return current to storage capacitor $C_1$ of input source 19. The energy stored in inductor $L_2$ at the end of horizontal trace is transferred into the deflection circuit during the subsequent horizontal retrace interval. The loop gain of regulator control circuit 28 is increased by the use of load compensation circuit 30 enabling the regulation range $t_6$–$t_7$ to be a smaller interval. Further, the amplitude of the current $i_1$ at the end of trace is higher when using load compensation circuit 30, thereby providing additional load regulation capability. The peak amplitude of the retrace pulse voltage $V_r$ is better regulated with load variations when using compensation circuit 30 because of the additional regulation capability provided by that circuit.

Regulator control circuit 28 of FIG. 1 controls the peak retrace voltage. Without compensation circuit 30, a load increase causes a retrace time increase and also a trace voltage increase. Thus, the trace voltage depends upon the retrace time. Good picture stability is obtained when both the trace and retrace voltages are kept constant. This is achieved by means of compensation circuit 30 maintaining a constant retrace time under varying loads.

What is claimed is:

1. A regulated power supply and deflection circuit, comprising:
    a deflection winding;
    a deflection circuit coupled to said deflection winding for generating scanning current therein;
    a flyback transformer coupled to said deflection circuit;
    a retrace resonant circuit for producing transformer retrace pulse voltages across windings of said flyback transformer during a retrace interval;
    a source of supply energy;
    a load circuit coupled to a winding of said flyback transformer and energized by the voltage developed across that winding to draw a load current therefrom;
    a first inductance coupled to said flyback transformer;
    switching means for coupling said source of supply energy to said first inductance, said switching means varying in conduction for controlling the energy stored in said first inductance and transferred to said load circuit;
    a second inductance coupled to said flyback transformer; and
    means for producing variation of current in said second inductance that is indicative of variation of the load current drawn by said load circuit, said flyback transformer coupling said second inductance to said retrace resonant circuit for controlling the retrace time in accordance with said variation of current in said second inductance.

2. A circuit according to claim 1 wherein said flyback transformer couples said second inductance to said retrace resonant circuit in a manner that substantially eliminates the tendency of the duration of the retrace time to change with variation of the load current.

3. A circuit according to claim 2 including a regulator control circuit for controlling the operation of said switching means to maintain constant the amplitude of the voltage across a winding of the flyback transformer during the retrace interval.

4. A regulated power supply and deflection circuit, comprising:
    a deflection winding;
    a deflection circuit coupled to said deflection winding for generating scanning current therein;
    a flyback transformer coupled to said deflection circuit;

a retrace resonant circuit for producing transformer retrace pulse voltages across windings of said flyback transformer during a retrace interval;

a source of supply energy;

a load circuit coupled to a winding of said flyback transformer and energized by the voltage developed across that winding to draw a load current therefrom;

means coupled to said source of supply energy for controlling the transfer of energy between said source and said load circuit;

an inductance coupled to said flyback transformer; and means for producing variation of current in said inductance that is indicative of variation of the load current drawn by said load circuit, including a second transformer with a first winding thereof coupled to said inductance and a second winding thereof coupled to said flyback transformer, said flyback transformer coupling said inductance to said retrace resonant circuit for controlling the retrace time in accordance with said variation of current in said inductance.

5. A circuit according to claim 4 wherein said source of supply energy is coupled to a first winding of said flyback transformer and said deflection circuit is coupled to a second winding of said flyback transformer that is isolated from said first winding.

6. A circuit according to claim 4 wherein said energy transfer controlling means comprisies first and second switches coupled to said flyback transformer in a push-pull arrangement.

7. A circuit according to claim 6 including the series arrangement of a capacitor, a second inductance and a winding of said flyback transformer coupled across one of the two switches of said switching means.

8. A circuit according to claim 4 including a rectifier coupled to said inductance and a capacitor coupled to said rectifier for generating a first DC voltage.

9. A circuit according to claim 8 wherein said source of supply energy comprises a source of a second DC voltage and wherein said capacitor is coupled to said source of second DC voltage to provide a source of boost voltage for said flyback transformer.

10. A circuit according to claim 1 wherein said source of supply energy and said first inductance are coupled to a first winding of said flyback transformer and said deflection circuit is coupled to a second winding of said flyback transformer and electrically isolated from said source and first inductance.

11. A regulated power supply and deflection circuit, comprising:

a deflection winding;

a deflection circuit coupled to said deflection winding for generating scanning current therein;

a source of a DC input voltage;

a flyback transformer coupled to said source;

a retrace resonant circuit including said deflection winding coupled to said flyback transformer for producing transformer retrace pulse voltages across windings of said flyback transformer during a retrace interval;

a load circuit coupled to a winding of said flyback transformer and energized by the voltage developed across that winding to draw a load current therefrom;

a first inductance coupled to said flyback transformer;

switching means coupled to said source and to said first inductance, said switching means varying in conduction for controlling the transfer of energy between said source and said load circuit;

a second inductance coupled to said retrace resonant circuit;

means for producing variation of current in said second inductance that is indicative of variation of the load current drawn by said load circuit for controlling said retrace interval in accordance with said load current; and rectifying and filtering means coupled to said source of DC input voltage and responsive to the current in said second inductance for generating an eneregizing DC voltage that varies in accordance with said variation of current and that is applied to said flyback transformer.

* * * * *